United States Patent [19]

Schewe et al.

[11] Patent Number: 4,703,382

[45] Date of Patent: Oct. 27, 1987

[54] THIN-FILM MAGNETIC HEAD FOR PERPENDICULAR (VERTICAL) RECORDING

[75] Inventors: Herbert Schewe, Herzogenaurach; Heinrich Diepers, Hochstadt/A., both of Fed. Rep. of Germany

[73] Assignee: Siemens Aktiengesellschaft, Munich, Fed. Rep. of Germany

[21] Appl. No.: 684,030

[22] Filed: Dec. 20, 1984

[30] Foreign Application Priority Data

Dec. 23, 1983 [DE] Fed. Rep. of Germany ....... 3346777

[51] Int. Cl.$^4$ ............................................. G11B 5/127
[52] U.S. Cl. .................................. 360/125; 360/126; 360/123
[58] Field of Search ............... 360/110, 111, 112, 122, 360/123, 125, 119, 126

[56] References Cited

U.S. PATENT DOCUMENTS

| 2,933,721 | 4/1960 | Hagopian ............................ 360/123 |
| 3,781,476 | 12/1973 | Hamazono et al. .................. 360/123 |
| 4,287,544 | 9/1981 | Lazzari ................................ 360/131 |
| 4,295,173 | 10/1981 | Romankiw et al. ............. 360/123 X |
| 4,546,398 | 10/1985 | Toda et al. ....................... 360/123 X |

FOREIGN PATENT DOCUMENTS

| 0012910 | 7/1980 | European Pat. Off. . |
| 0071489 | 2/1983 | European Pat. Off. . |
| 2924013 | 1/1980 | Fed. Rep. of Germany . |
| 0012522 | 1/1980 | Japan ................................ 360/123 |
| 0139624 | 10/1980 | Japan ................................ 360/125 |
| 0302745 | 7/1971 | U.S.S.R. ............................. 360/111 |

OTHER PUBLICATIONS

Arnold et al., Denser Disk Drives Poised for Surge, 6/21/79.

"IEEE Transactions on Magnetics", vol. MAG-16, No. 1, (Jan. 1980), pp. 71-76.
"IEEE Transactions on Magnetics", vol. MAG-18, No. 6, (Nov. 1982), pp. 1158-1163, 1170-1172.
"IEEE Transactions on Magnetics", vol. MAG-17, No. 6, (Nov. 1981), pp. 2538-2540, 3120-3122.
"IEEE Transactions on Magnetics", vol. MAG-16, No. 5, (Sep. 1980), pp. 967-972.
"IEEE Transactions on Magnetics", vol. MAG-19, No. 5, (Sep. 1983), pp. 2239-2244.

Primary Examiner—Robert S. Tupper
Assistant Examiner—Andrew L. Sniezek
Attorney, Agent, or Firm—Kenyon & Kenyon

[57] ABSTRACT

A magnetic thin-layer head with a stratified build-up on a nonmagnetic substrate for a recording medium which can be magnetized perpendicularly (vertically), comprises a ring-head-like magnetic conduction body for carrying the magnetic flux. The conduction body has two magnet legs, of which the poles facing the recording medium are arranged in tandem as seen in the direction of motion of the head and having a predetermined spacing from each other. An at least largely flat read/write coil winding is provided, the turns of which extend through a space formed between the magnet legs. In this magnetic head, a switchable write/read function with a sufficiently large read voltage is obtainable. In addition to the write/read coil winding, a further coil winding is provided only for executing the write function, the turns of which are at least in part arranged in a region outside of the ring-head-like conduction body. In particular, the magnet leg located on the side of the magnetic head facing away from the substrate may be selected by means of predermined current flow directions in the write/read coil winding and the further write coil winding as the recording magnet leg.

12 Claims, 6 Drawing Figures

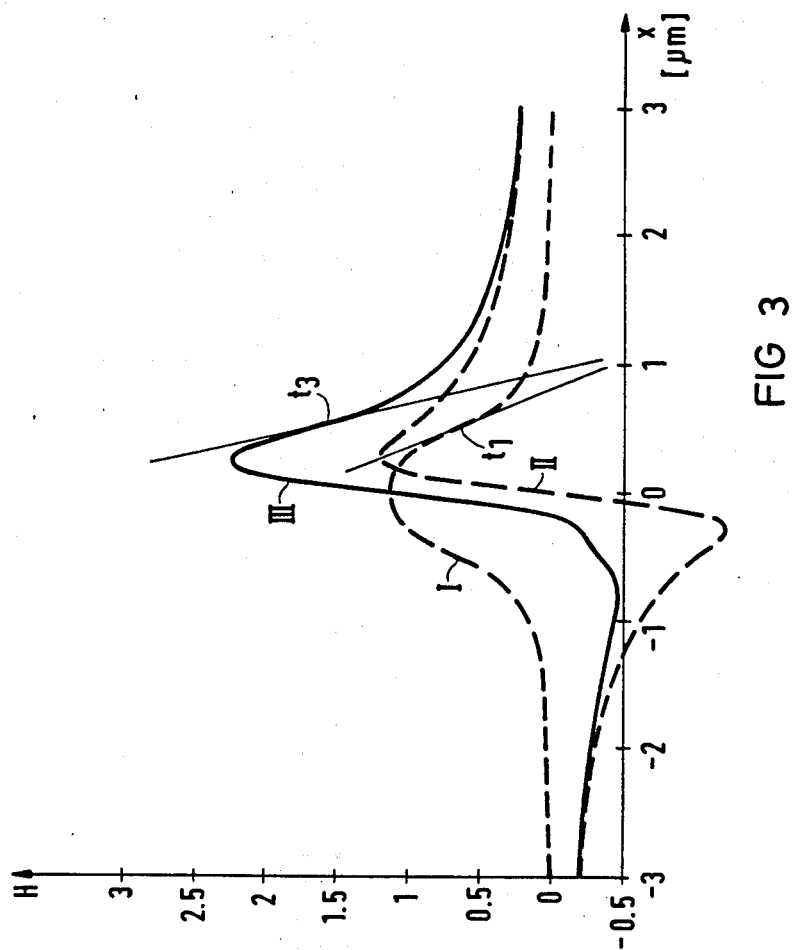
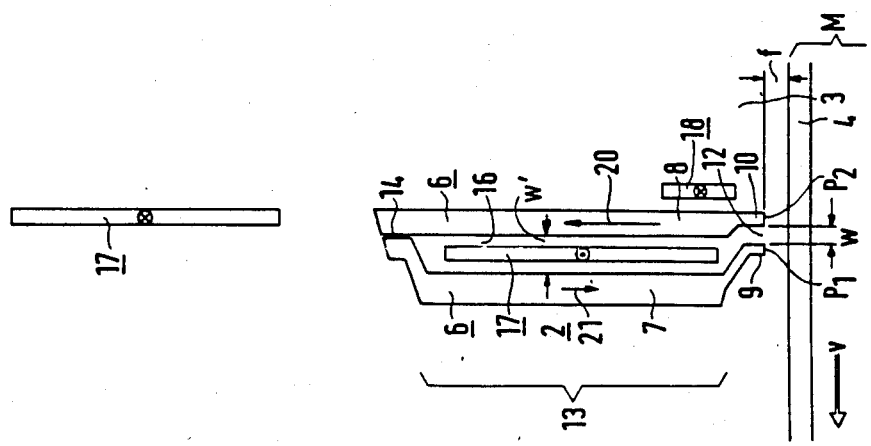

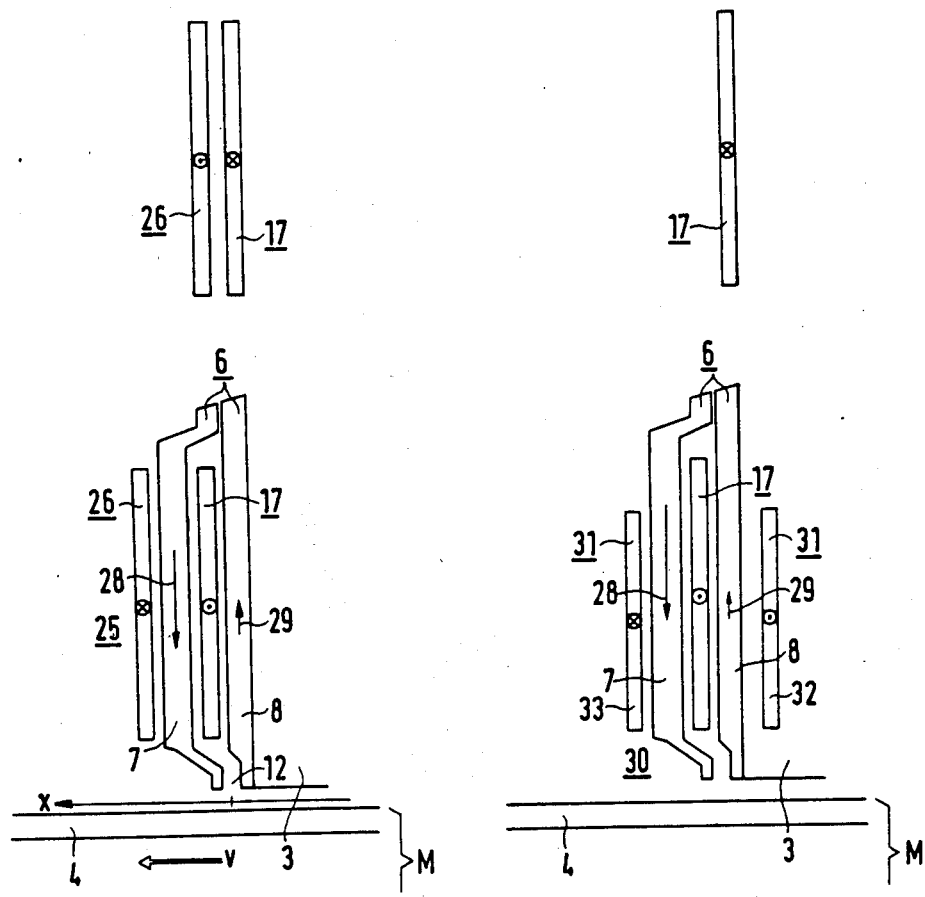

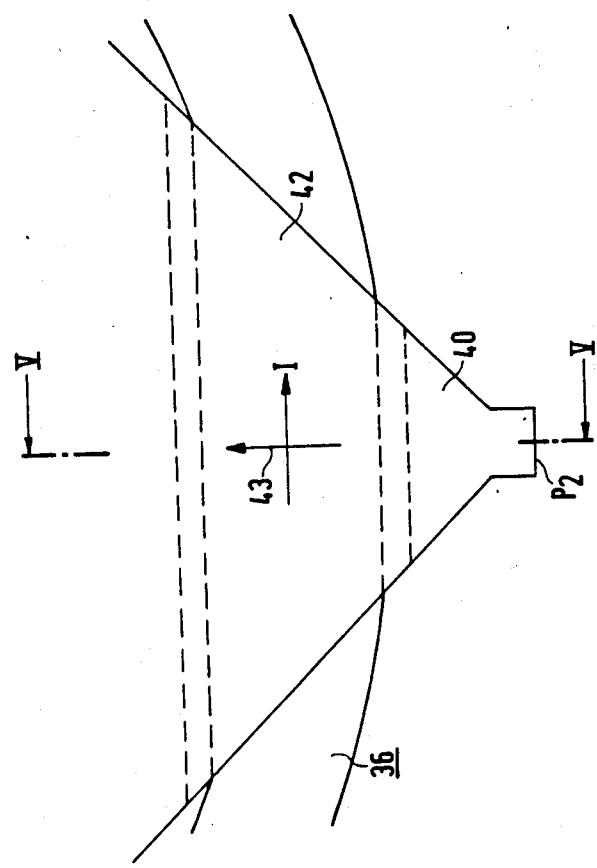
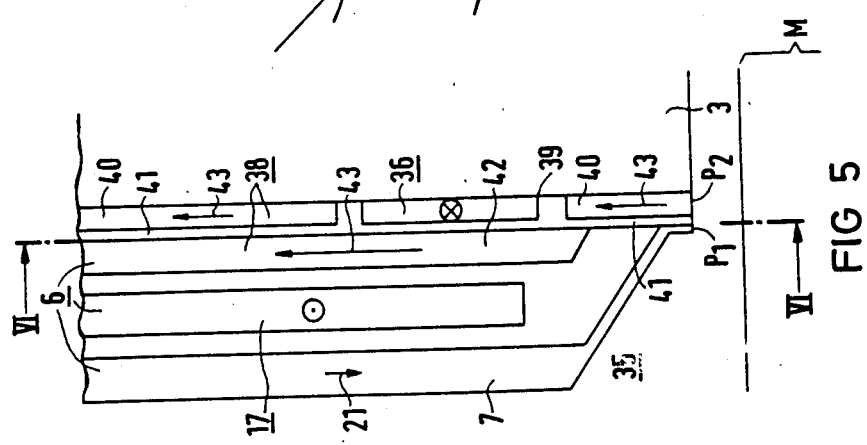

THIN-FILM MAGNETIC HEAD FOR PERPENDICULAR (VERTICAL) RECORDING

BACKGROUND OF THE INVENTION

The present invention relates to a magnetic thin-film head comprising a stratified build-up on a nonmagnetic substrate for a recording medium which is provided with a magnetizable storage layer into which information can be written along a track by perpendicular or vertical magnetization of the storage layer. Such magnetic heads have a ring-shaped magnetic conduction body for carrying the magnetic flux, the conduction body having two magnet legs, the poles of which facing the recording medium are arranged in tandem as viewed in the direction of motion of the head and at a predetermined spacing from each other. The turns of an at least largely flat write/read coil winding extend through a space formed between the magnet legs. See, e.g., European patent application EP No. 0 012 910 A1.

The principle of perpendicular magnetization for storing information is generally known. See, for instance, IEEE Transactions on Magnetics, vol. MAG-16, no. 1, Jan. 1980, pages 71 to 76; DE-OS 29 24 013; U.S. Pat. No. 4,287,544; or the cited European patent application. For this principle, which often is also called vertical magnetization, special recording media in the form of rigid magnetic discs, flexible individual discs (floppy discs) or magnetic tapes are required. Such a recording medium has at least one magnetizable storage layer of predetermined thickness which contains magnetically anisotropic material, especially of a CoCr alloy. The axis of the so-called easy direction of magnetization of this layer is directed perpendicularly to the surface of the medium. By means of a special magnetic head, the bits of information are then written along a track in successive sections, also called cells or blocks, by appropriate magnetization of the storage layer. In practice, the magnetic flux changes are generally used as information, i.e., the transition from one direction of magnetization to the opposite one. The sections have a dimension in the longitudinal direction of the track which is also called wavelength. This dimension can be substantially smaller than that required by the method of longitudinal or horizontal storage, which is given by the demagentization. Thus, the information density in the recording medium can be increased advantageously according to the principle of perpendicular magnetization.

The combined write and read heads, known for the principle of longitudinal magnetization, i.e., head types by which the write as well as the read function can be executed, however, cannot be used directly also for perpendicular magnetization. If these heads are used, which generally have a ring-head-like shape, the flux conduction desired also for a the principle of perpendicular magnetization to form a circuit closed as far as possible can be obtained with low magnetic resistance. However, difficulties arise with these ring heads when reading the written information.

One is therefore compelled to develop special write and read heads for the principle of perpendicular magnetization. Such a magnetic head has, in general, a so-called main pole, with which a vertical magnetic field sufficiently strong for changing the magnetization of the individual sections of the storage layer is produced. The necessary magnetic return can then take place, for instance, by a so-called auxiliary pole on the opposite side of the recording medium. See the mentioned literature reference, IEEE Trans Magn., vol. MAG-16. A magnetic return can further be accomplished by a special auxiliary pole which is located on the same side as the main pole. See IEEE Trans Magn., vol. MAG-17, no. 6, Nov. 1981, pages 3120 to 3122, or vol. MAG-18, no. 6, Nov. 1982, pages 1158 to 1163, or the above mentioned patent literature. Accordingly, the magnetic read and write head known from the mentioned European patent application contains a ring-head-like magnetic conduction body having two magnet legs which carry the magnetic flux and the ends of which, facing the recording medium, form a main and an auxiliary pole which are arranged in tandem as seen in the direction of motion of the head and which are arranged at a predetermined spacing from each other. The turns of an at least largely planar coil winding extend through a space which is formed between these two magnet legs, the space being filled with insulating materials. With this winding, the main pole is excited for the write function, and for the read function, the excitation of the main pole is recorded. The turns of this winding as well as the magnet legs are applied by a thin-film technique on a nonmagnetic substrate.

With the magnetic head type which is known, for instance, from the above mentioned patent references, the auxiliary pole should serve in any case only for the return of the magnetic flux. Possible concurrent writing of the auxiliary pole optionally can be tolerated because the recording main pole always lags it and therefore overwrites the information which may have been written by the auxiliary pole. However, in order to prevent concurrent reading of the auxiliary pole with its trailing edge at least to a large extent, the so-called air gap formed between the two poles would have to be relatively wide in order to assure a far-reaching reduction of the magnetic flux density at the auxiliary pole. Correspondingly wide gap layers however, can be realized only with difficulty by thin-film techniques.

Because of these difficulties, magnetic heads have already been proposed, in which the use of a separate auxiliary pole is dispensed with. See IEEE Trans. Magn., vol. MAG-18, no. 6, Nov. 1982, pages 1170 to 1172; EP No. 0 071 489 A2. In these magnetic heads, the necessary magnetic return is provided by the stray flux. Accordingly, the magnetic head known from the last mentioned European patent application contains substantially only a single magnet leg which faces the recording medium and which is associated with a planar write and read coil winding. With such a magnetic head type, which is also called a single-pole head, the requirements for an effective write function can generally be met, at least largely. Accordingly, a field strength sufficiently large for recording at high bit densities for reversing the magnetization of the storage layer of the recording medium is to be achieved and, on the other hand, the drop of the magnetic field at the trailing edge of the head should be as steep as possible so that small transition widths of the magnetization reversal can be realized. See IEEE Trans. Magn., vol. MAG-19, no. 5, Sep. 1983, pages 2239 to 2244. A sufficiently large read signal, however, cannot be obtained if the auxiliary pole is omitted.

Due to these mentioned problems in reading, systems with separate write and read heads are known so that these heads can be adapted optimally to the respective function. See IEEE Trans. Magn., vol. MAG-16, no. 5, Sept. 1980, pages 967 to 972 or vol. MAG-17, no. 6, Nov. 1981, pages 2538 to 2540. For the read function, the ring heads known per se from the principle of longitudinal magnetization can be used, while the write function must be carried out with the mentioned single-pole heads. These single pole heads each have an auxiliary pole on the back side of the recording medium. The design of similar systems, however, for reading and writing with special heads adapted to the respective function is relatively elaborate.

SUMMARY OF THE INVENTION

It is therefore an object of the present invention to improve the magnetic read and write head mentioned above such that a magnetic head having a switchable write and read function according to the principle of perpendicular magnetization with relatively high efficiency is provided. In particular, it should therefore be possible to generate with this magnetic head a sufficiently large read voltage and to meet, in addition, at least largely the requirements mentioned for the write function.

These and other objects of the present invention are achieved by providing a magnetic thin layer head having a ring-shaped flux conduction body, that, in addition to the provision of a write/read coil winding, comprises a further coil winding provided only for executing a write function, the turns of which are arranged, at least partially, in a region outside the ring shaped conduction body.

The advantages connected with this embodiment of the magnetic head are, among other things, that the further write coil winding can be made with only a small number of turns. Thereby, the technologically difficult structuring problems in the fabrication of this coil winding can largely be avoided. On the other hand, the write/read coil winding which draws only relatively little current, can be structured very finely. Because the number of turns of this winding can be chosen rather large, this means a corresponding increase of the read voltage.

Due to the special geometric configuration of the coil windings as well as of the writing magnet leg associated with these coil windings, the magnetic field distribution of a ring head is produced in the magnetic head according to the invention during recording with the write/read coil winding, while the further write coil winding causes the magnetic field distribution of a single-pole head. The superposition of the two fields then results in an overall vertical field in the recording magnet leg, which makes possible a distinct increase of the write field and of the corresponding slope of the write field. For reading with the magnetic head, the additional write coil winding remains inoperative. The magnetic head can then be operated for the read function as a ring head in a manner known per se.

BRIEF DESCRIPTION OF THE DRAWINGS

The invention will now be explained in greater detail in the following detailed description with reference to the drawings, in which:

FIGS. 1 and 2 schematically show in longitudinal section two embodiments of a magnetic head according to the invention;

FIG. 3 shows graphically the vertical magnetic base field which can be generated by the magnetic head according to FIG. 2;

FIGS. 4 and 5 show two further embodiments of magnetic heads according to the invention in a presentation corresponding to FIGS. 1 or 2; and FIG. 6 is a sectional view through the magnetic head of FIG. 5 taken along the line VI—VI.

DETAILED DESCRIPTION

With reference now to the drawings, a magnetic write and read head according to the invention is shown in FIG. 1, and comprises a ring-head-like magnetic conduction body 6 known per se for the principle of perpendicular or vertical magnetization. See, for instance, EP-O No. 012 910 A1. The head, generally designated with the reference numeral 2 in FIG. 1 and shown during its write function, is located on the flat side of a substrate 3 which forms, for instance, the end face or the rear face of a customary element designated as a flying body, not detailed in the figures. The head may be guided along a track relative to a vertically magnetizable recording medium M at a low flying height f of, for instance, 0.2 μm over a separate storage layer 4 of the medium of, for instance, CoCr. In general, the recording medium is moved underneath the edge. The corresponding relative direction of motion of the recording medium M with respect to the magnetic head 2 is indicated by an arrow v.

The magnetic head 2 contains a magnetic conduction body 6 which carries the magnetic flux and is similar to a ring head having two magnet legs 7 and 8. These legs are oriented largely and in particular, at their ends 9 and 10 facing the recording medium M, at least approximately perpendicularly to the surface of the recording medium M and form respective magnetic poles $P_1$ and $P_2$. Between these two poles, an air gap 12 having an advantageously small longitudinal width w, i.e., a width pointing in the direction of motion v, of less than 1 μm and in particular, less than 0.3 μm, is formed. In a central region 13 of the ring-head-like conduction body 6, the distance between the two magnet legs 7 and 8 is enlarged relative to the gap width w, in that the magnet leg 7 to the rear with respect to the direction of motion is formed in this region to a larger distance w' with respect to the front magnet leg 8 which is straight and is closest to the substrate 3. Outside this region 13, the magnet leg 7 is joined, on the side of the magnet leg 7 facing away from the recording medium M, in a manner known per se in a connecting region 14 to the magnet leg 8, so that the ring-head-like shape of the conduction body 6 is obtained. In the space 16 thus provided in the central region between the two magnet legs 7 and 8, a flat coil winding 17 extends, which serves as a write as well as a read coil. This coil winding, only indicated generally in the figure, typically has one or several layers with a relatively large number of turns.

For the write function, according to the invention, an additional, for instance, largely planar coil winding 18 is provided, the turns of which pass on the outside of one of the two magnet legs, for instance, the inner one, i.e., of the leg 8 facing the substrate 3. The turns of this write coil winding 18 arranged largely parallel to the read coil winding 17 are therefore separated by the magnet leg 8 in the region 13 of the ring-head-like conduction body 6.

According to the invention, the write currents are to flow in both coil windings 17 and 18, the write currents illustrated by the current-flow direction symbols shown, which can be of opposite direction at least in the area of the ring-head-like conduction body 6. In the magnet leg 8 enclosed by the two coil windings, a magnetic flux indicated by arrow 20 is generated, which is obtained by the superposition of the fields respectively generated by the two coil windings. This magnetic flux is substantially larger in leg 8 and, therefore, at the corresponding pole $P_2$, than the magnetic flux which is caused to flow in the outer magnet leg 7 and is indicated by a line with arrow 21 with a comparatively shorter length. The magnetic head 2 according to the invention thus writes advantageously as a quasi single-pole head, substantially only with the pole $P_2$ of the magnet leg 8. Except for this write function, the coil winding 18 remains without current, however, so that for reading, the magnetic head 2 is operated only with the read coil winding 17 as an ordinary ring head.

For the fabrication of the magnetic head 2 using a thin-layer or thin-film technique, a flying body with a substrate is generally used which comprises, for instance, TiC and $Al_2O_3$. For building up the magnet legs 7 and 8, thin magnetic layers of special magnetically soft materials such as special NiFe alloys (permaloy: Ni/Fe-81/19) or of FeB are applied by sputtering, vapor deposition or electroplating and are separated from each other by a nonmagnetic spacer, for instance, of $SiO_2$ or $Al_2O_3$. The magnetization of these magnetic layers lies in the layer plane. Due to the fabrication process, these magnetic layers exhibit uniaxial anistropy, i.e., each magnetic layer has two anisotropic directions, denoted the easy and hard directions of magnetization. The magnetization is preferably parallel or antiparallel to the easy direction of magnetization. The easy direction of magnetization, which can be caused, for instance, during the application of the respective layer by an applied magnetic field, generally lies always perpendicular to the direction of the magnetic flux in the conduction body 6, i.e., in the vicinity of the magnet poles $P_1$ and $P_2$, substantially parallel to the surface of the recording medium M. The different grown layers are structured by techniques known per se such as photolithography, plasma-, ion beam or wet-chemistry etching in order to so form the two magnet legs of the head.

For building up the magnetic head 2, the few turns of the coil provided as the additional write-coil winding 18 are first applied to the substrate 3 or its insulating layer. For instance, a recess can be etched into the substrate surface comprising, for instance, $Al_2O_3$, by ion beam or plasma etching. Subsequently, a metal layer, for instance, of Cu or Au or Al is deposited and structured and leveled in a manner known per se. The further construction of the magnetic head can then be made on a largely plane substrate. Next, the inner magnet leg 8 is applied. This magnet leg is relatively thick except for the region of its pole tip $P_2$, for instance, with a thickness of 2 to 4 $\mu$m and is tapered toward the pole tip P to about 0.2 to 1 $\mu$m. The magnet leg 8 is then coated with an insulating and gap layer except for the junction 14 with the second magnet leg 7; this layer comprises, for instance, a hard material such as $Al_2O_3$. After this magnet leg and the gap layer are completed, the individual turns 5 of the winding 17 serving as the write and read coil are likewise prepared and structured by a thin-layer technique in at least one plane parallel to the substrate surface. Since the currents flowing in the winding 17 are relatively small, the conductor cross section can be chosen accordingly small. However, extremely small thicknesses and very fine structures should be avoided for manufacturing reasons. The turns of this winding comprising, for instance, Cu, Au or Al, which is generally made with several layers, can have cross sections of, for instance, 0.5 $\mu$m $\times$ 3 $\mu$m and are embedded in a special leveling material. This material may be, for instance, a synthetic varnish, particularly with a polyimide base.

In a next process step, the second laminated magnet leg 7 is then applied and structured. The magnetic layers of this leg 7 in the region of the gap 12 are then separated from the magnet leg 8 only via the gap layer and, in the central region 13, additionally via the leveling layers with the embedded turns of the coil winding 17. In the region of the junction 14, the two magnet legs 7 and 8 are joined together so that a ring-head-like shape of the magnetic head is obtained.

Lastly, a relatively thick protective layer, for instance, of $Al_2O_3$ is provided for the protection of the thin-layer magnetic head 2 made in this manner.

The embodiments of magnetic heads according to the invention indicated in FIGS. 2 and 4 differ from the described magnetic head 2 according to FIG. 1 substantially only by the position of the turns of the additional write coil winding relative to the write/read coil winding. Identical parts in the various figures are provided with the same reference symbols.

In the modification of the magnetic head 2 according to FIG. 1 shown in FIG. 2, the winding 26, serving as the write coil, is not arranged in the magnetic head 25 on the inside of the magnetic head immediately at the surface of the substrate 3, but is located on the outside of the magnetic head. Accordingly, the write function is executed substantially by the outer magnet leg 7 in that the magnetic flux 28 caused by the superposition of the magnetic fields generated by the two coil windings is substantially larger in this leg than the magnetic flux 29 in the inner leg 8 facing the substrate 3.

The magnetic head 25 shown in FIG. 2 is shown in the process of a write function, for which purpose, according to the invention, the additional write coil winding 26 as well as the write/read coil winding 17 are employed. Magnetic field ratios occur in the storage layer 4 of the recording medium, as can be seen from the diagram of FIG. 3. The field strength H is chosen as the ordinate in arbitrary units, while the location x relative to the center of the gap 12 is plotted on the abscissa in micrometers (see FIG. 2). The curve designated with I is obtained for the magnetic head with the write coil winding 26 connected and the write/read coil winding 12 disconnected, while the curve designated with II is obtained if the write/read coil winding 17 only is excited. If, on the other hand, both coil windings 17 and 26 are used for writing, field strengths can be developed which result in the curve designated with III. The efficiency of the write/read coil winding 17 thus can have rather high values, for instance, 70%. The efficiency of the write coil winding 26 depends primarily on the geometric arrangement of the coil winding in the vicinity of the pole and is the higher, the closer the coil winding is to the corresponding pole. Typically, the efficiency may be about 10%. Because of the different efficiencies, however, the resistances of the two coil windings 17 and 26 can be chosen so that, if these coils are connected in parallel and the polarity is taken into consideration, an optimum total magnetic field is generated, the shape of which assumes the shape designated with III in the diagram.

As can further be seen from FIG. 3, a steeper slope of the magnetic recording field is generated advantageously also by the simultaneous use of the write/read coil winding 17 and the write coil winding 26 for the write function.

Accordingly, the tangent, shown in the diagram, to the curve I assigned only to the write coil winding 26 shows less slope than the corresponding tangent $t_3$ to the curve III of the total field jointly generated by the write coil winding 26 as well as by the write/read coil winding 17.

While it is assumed in the embodiments of the magnetic heads 2 and 25 according to FIGS. 1 and 2, respectively, that the write coil windings 18 and 26 are largely planar, an additional write coil winding 31 also can be provided according to an embodiment of a magnetic head 30 according to the invention indicated in FIG. 4. This additional winding surrounds the ring-head-like conduction body 6 formed by the two magnet legs 7 and 8, at least in a partial region. Coil winding 31 of the magnetic head 30, which can likewise be made by a thin-layer technique, is formed, for instance, by a single wide coil loop or by several turns. Accordingly, it contains a flat inner part 32 on the surface of the substrate 3, which is connected to a flat outer part 33 on the outside of the magnet leg 7 for forming the winding 31. Due to the current flow directions in the write/read coil winding 17 assumed in the figure and the further write coil winding 31, the write function is caused substantially by the outer magnet leg 7. The writing could, of course, also be done by the inner magnet leg 8 if the direction of current flow in one of the coil windings is changed.

In FIGS. 5 and 6, two longitudinal sections, mutually rotated 90°, of part of an embodiment of a magnetic head 35 according to the invention are shown, for which the magnetic head 2 reproduced in FIG. 1 is the starting point. Deviating from this magnetic head 2, the additional write coil winding 36 advantageously is integrated in the magnetic head 35 on the side of the substrate 3 into the recording magnet leg designated with 38. To this end this magnet leg has a recess 39 in the vicinity of its pole $P_2$, through which at least one turn of the additional write coil winding 36 extends. For fabricating this magnet leg 38, at least one layer 40 of the magnetically soft leg material can first be applied with a thickness corresponding to the turn of the coil winding 36 on the surface of the substrate 3. Adjacent thereto, the recess 39 is formed into this layer, and the corresponding turn of the coil winding 36 is placed in this recess. After this build-up is insulated, for instance, by means of a gap and insulating layer 41, the remaining layers 42 of the magnet leg 38 are applied. The fabrication steps following this may correspond to those for fabricating the magnetic head 2 according to FIG. 1.

In FIG. 6, which is a sectional view taken along line VI—VI of FIG. 5, along the surface of the magnet leg 38, the parts covered by this magnet leg are indicated by dashed lines. The direction of the magnetic flux 43 generated in the leg 38 as well as the flow direction of the current I in the coil winding 36 are illustrated by the arrows.

In the embodiment of the magnetic head 35 shown in FIGS. 5 and 6, the additional coil winding 36 serving as a write coil can be realized especially simply. For example, the at least one layer 40 of the magnet leg 38 may be structured in the vicinity of the pole tip $P_2$ of the magnetically soft material in such a manner that it can be used partially as a conductor run for the coil winding 36.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. A magnetic thin-layer head comprising a stratified build-up on a nonmagnetic substrate for a recording medium, the recording medium being provided with a magnetizable storage layer into which information can be written along a track by perpendicular or vertical magnetization of the storage layer, the magnetic head having a ring-shaped conduction body for carrying magnetic flux, the conduction body having two magnet legs, ends of the magnet legs facing the recording medium comprising magnetic poles, the poles being arranged in tandem as seen in the direction of motion of the head relative to the recording medium, and having a predetermined distance from each other, an at least largely flat write/read coil winding being further provided having a plurality of turns, said turns of said winding extending through a space formed between the magnet legs, and further comprising an additional coil winding provided only for executing a write function together with said write/read coil winding, said additional coil winding having at least one turn which is disposed at least partially in a region located outside of the ring-shaped conduction body and being separated from said write/read coil winding by one of said two magnet legs, said one leg serving as a leg for executing substantially alone said write function, the current in said write/read coil winding having a first current flow direction and the current in said additional coil winding having a current flow direction opposite to said first current flow direction during execution of said write function.

2. The magnetic head recited in claim 1, wherein the one magnet leg lying further away from the substrate than the other magnet leg is essentially a recording leg executing said write function due to the provision of predetermined electrical current flow directions in the write/read coil winding and said additional write coil winding.

3. The magnetic head recited in claim 1, wherein the at least one turn of said additional write coil winding is arranged at least partly on the side of the magnetic conduction body closer to the substrate.

4. The magnetic head recited in claim 3, wherein said current flow direction in the at least one turn of the additional write coil winding disposed on the substrate side of the head is largely parallel to the current flow direction in adjacent turns of the write/read coil winding.

5. The magnetic head recited in claim 3, wherein the at least one turn of the additional write coil winding is arranged at least in part in the vicinity of an end of an adjacent magnet leg.

6. The magnetic head recited in claim 1, wherein said additional write coil winding has at least one turn in one plane.

7. The magnetic head recited in claim 1, wherein the additional write coil winding is disposed at least in part in a recess in a magnet leg adjacent thereto.

8. The magnetic head recited in claim 1, wherein the write/read coil winding comprises a largely planar structure having several turns in at least one layer.

9. The magnetic head recited in claim 1, wherein the magnetic conduction body comprises at least in part a magnetically soft material.

10. The magnetic head recited in claim 9, wherein the magnetic conduction body comprises a material having an easy and a hard direction of magnetization, the easy direction of magnetization being oriented largely perpendicularly to the conduction direction of the magnetic flux.

11. The magnetic head recited in claim 1, wherein the predetermined distance between the ends of the poles of the magnet legs facing the recording medium is at most 1 $\mu$m.

12. The magnetic head recited in claim 1, wherein a space is provided between the magnet legs, a distance of the space between the magnet legs being greater than the predetermined distance between the ends of the magnet legs facing the recording medium, the turns of the read/write coil winding being partially disposed therein.

* * * * *